(12) United States Patent
Brimeyer et al.

(10) Patent No.: US 11,032,970 B2
(45) Date of Patent: Jun. 15, 2021

(54) VARYING A HYDRAULIC CYLINDER MECHANICAL ADVANTAGE TO OBTAIN SMOOTHER FLOAT PRESSURE

(71) Applicant: Deere & Company, Moline, IL (US)

(72) Inventors: Alex Brimeyer, Bettendorf, IA (US); Michael L. Vandeven, Princeton, IA (US); Joshua R. Pierson, Davenport, IA (US)

(73) Assignee: Deere & Company, Moline, IL (US)

( * ) Notice: Subject to any disclaimer, the term of this patent is extended or adjusted under 35 U.S.C. 154(b) by 166 days.

(21) Appl. No.: 16/174,762

(22) Filed: Oct. 30, 2018

(65) Prior Publication Data
US 2020/0128741 A1    Apr. 30, 2020

(51) Int. Cl.
| | |
|---|---|
| *A01D 41/14* | (2006.01) |
| *A01D 41/06* | (2006.01) |
| *F15B 1/02* | (2006.01) |
| *F15B 15/06* | (2006.01) |
| *F16H 21/44* | (2006.01) |

(52) U.S. Cl.
CPC .......... *A01D 41/145* (2013.01); *A01D 41/06* (2013.01); *F15B 1/024* (2013.01); *F15B 15/06* (2013.01); *F16H 21/44* (2013.01)

(58) Field of Classification Search
CPC .... A01D 41/145; A01D 41/06; A01D 41/141; A01D 47/00; F15B 1/024; F15B 15/06; F15B 21/44; F15B 13/044; F15B 11/08; A01B 63/08; A01B 63/10; A01B 63/108
See application file for complete search history.

(56) References Cited

U.S. PATENT DOCUMENTS

| | | | |
|---|---|---|---|
| 3,665,688 A * | 5/1972 | Sheehan | A01D 41/14 56/14.6 |
| 3,959,957 A * | 6/1976 | Halls | A01D 41/14 56/208 |
| 4,206,582 A * | 6/1980 | Molzahn | A01D 57/00 56/15.8 |
| 4,313,294 A | 2/1982 | Martenas | |
| 4,622,803 A | 11/1986 | Lech | |
| 4,724,661 A * | 2/1988 | Blakeslee | A01D 43/107 56/15.8 |
| 5,046,230 A * | 9/1991 | Hurlburt | A01D 41/145 29/426.1 |
| 5,157,905 A * | 10/1992 | Talbot | A01D 41/14 56/15.9 |

(Continued)

FOREIGN PATENT DOCUMENTS

GB    1288874 A    9/1972

OTHER PUBLICATIONS

European Search Report issued in counterpart application No. 19205916.0 dated Mar. 16, 2020 (06 pages).

*Primary Examiner* — Arpad Fabian-Kovacs
(74) *Attorney, Agent, or Firm* — Joseph R. Kelly; Kelly, Holt & Christensen PLLC

(57) ABSTRACT

A float cylinder and accumulator are coupled between a header main frame and an attachment frame. The float cylinder is orientated so that its mechanical advantage in applying a float force to the header varies with the position of the main frame relative to the attachment frame. Similarly, the pressure exerted by the cylinder varies inversely with its mechanical advantage.

19 Claims, 3 Drawing Sheets

(56) References Cited

U.S. PATENT DOCUMENTS

| | | | | |
|---|---|---|---|---|
| 5,337,544 A * | 8/1994 | Lauritsen | A01D 67/00 | 56/15.7 |
| 5,535,578 A * | 7/1996 | Honey | A01D 41/145 | 56/14.9 |
| 5,562,167 A * | 10/1996 | Honey | A01B 73/00 | 16/18 R |
| 5,778,644 A * | 7/1998 | Keller | A01D 41/142 | 56/11.2 |
| 6,901,729 B1 * | 6/2005 | Otto | A01D 41/145 | 56/208 |
| 7,222,475 B2 | 5/2007 | Bomleny | | |
| 7,430,846 B2 * | 10/2008 | Bomleny | A01D 41/141 | 56/10.2 E |
| 7,603,837 B2 * | 10/2009 | Ehrhart | A01D 34/283 | 56/10.2 E |
| 7,703,266 B2 * | 4/2010 | Fackler | A01D 41/145 | 56/10.2 E |
| 7,707,811 B1 * | 5/2010 | Strosser | A01D 41/141 | 56/10.2 E |
| 8,401,745 B2 * | 3/2013 | Otto | A01D 41/145 | 701/50 |
| 8,769,920 B2 * | 7/2014 | Patterson | A01D 43/06 | 56/228 |
| 9,730,375 B2 * | 8/2017 | De Coninck | A01B 63/008 | |
| 9,968,033 B2 * | 5/2018 | Dunn | F15B 13/0401 | |
| 10,159,182 B2 * | 12/2018 | Berggren | A01B 63/023 | |
| 10,321,630 B2 * | 6/2019 | Talbot | A01D 41/145 | |
| 10,405,474 B2 * | 9/2019 | Brimeyer | A01D 41/16 | |
| 10,524,422 B2 * | 1/2020 | Brimeyer | A01D 41/06 | |
| 10,681,865 B2 * | 6/2020 | Dunn | A01D 41/141 | |
| 2003/0074876 A1 * | 4/2003 | Patterson | A01D 41/14 | 56/257 |
| 2006/0248868 A1 * | 11/2006 | Otto | A01D 41/145 | 56/10.2 E |
| 2006/0254232 A1 * | 11/2006 | Bomleny | A01D 41/141 | 56/10.2 E |
| 2006/0254234 A1 * | 11/2006 | Bomleny | A01D 41/141 | 56/10.2 E |
| 2007/0068129 A1 * | 3/2007 | Strosser | A01D 41/141 | 56/10.2 E |
| 2007/0214760 A1 | 9/2007 | Bomleny et al. | | |
| 2008/0078155 A1 | 4/2008 | Coers et al. | | |
| 2009/0069988 A1 * | 3/2009 | Strosser | A01D 41/141 | 701/50 |
| 2009/0071666 A1 * | 3/2009 | Ehrhart | A01D 75/20 | 172/1 |
| 2010/0287898 A1 | 11/2010 | Ringwald et al. | | |
| 2012/0285318 A1 * | 11/2012 | Jessen | A01B 63/1006 | 91/403 |
| 2013/0125521 A1 * | 5/2013 | Patterson | A01D 43/04 | 56/14.5 |
| 2014/0215992 A1 * | 8/2014 | Schraeder | A01D 41/06 | 56/14.7 |
| 2014/0237980 A1 * | 8/2014 | Verhaeghe | A01D 41/14 | 56/320.1 |
| 2015/0271999 A1 * | 10/2015 | Enns | A01D 41/141 | 700/275 |
| 2016/0135365 A1 * | 5/2016 | Cleodolphi | A01D 34/006 | 56/10.2 E |
| 2016/0183461 A1 * | 6/2016 | Neudorf | A01D 41/14 | 56/158 |
| 2018/0153102 A1 | 6/2018 | Dunn et al. | | |
| 2018/0295774 A1 * | 10/2018 | Nielsen | A01D 34/006 | |
| 2019/0029174 A1 * | 1/2019 | Talbot | A01D 41/145 | |
| 2019/0059223 A1 * | 2/2019 | Seiders, Jr. | A01B 63/008 | |
| 2019/0110397 A1 * | 4/2019 | Brimeyer | A01D 41/06 | |
| 2020/0077585 A1 * | 3/2020 | Garbald | A01B 63/008 | |

* cited by examiner

VARYING A HYDRAULIC CYLINDER MECHANICAL ADVANTAGE TO OBTAIN SMOOTHER FLOAT PRESSURE

FIELD OF THE DESCRIPTION

This description relates to agricultural equipment. More specifically, the present description relates to a closed system for applying generally consistent float pressure on the header of an agricultural harvester.

BACKGROUND

There are a wide variety of different types of agricultural equipment. Some such equipment includes agricultural harvesters.

It is common for agricultural harvesters (such as combine harvesters, forage harvesters, etc.) to have a header. The header is attached to a feeder house on the combine by an attachment frame. The header has a main frame that supports a cutter bar and a reel. The main frame is movable relative to the attachment frame. As the harvester travels, the header engages crop, severs it and transfers the crop into the harvester for further processing.

In such machines, it is common for the header to be set a given distance above the ground. Also, it is believed that improved harvesting performance can be achieved when the header generally follows the surface of the ground, so that it maintains roughly the same distance above the ground throughout the harvesting operation.

In order to achieve better ground following performance, some harvesters are configured to apply a float force to the header. The float force is a lifting force oriented to maintain the header at the given distance above the ground. The header often has ground engaging elements which provide a ground reference input to the header. Therefore, if the ground underneath the header falls, the header is normally weighted sufficiently to overcome the float force so the main frame drops relative to the attachment frame drop to follow the ground downward. If the ground under the header rises, then the ground engaging elements act to aid the float force in lifting the header (e.g., lifting the main frame relative to the attachment frame) to follow the ground upward.

It can thus be seen that if the float force is set too low, then the header will respond to the ground more slowly, which can result in the cutter bar on the header digging into the ground. However, if the float force is set too high, then the header will not fall fast enough to follow the ground, which results in missed crop, and poor harvesting performance.

Some machines are equipped with a float cylinder that has (or is attached to) an accumulator. These cylinders are normally configured in a nearly vertical orientation. Thus, the float force applied by the cylinder and accumulator varies based on the position of the main frame relative to the attachment frame.

The discussion above is merely provided for general background information and is not intended to be used as an aid in determining the scope of the claimed subject matter.

SUMMARY

A float cylinder and accumulator are coupled between a header main frame and an attachment frame. The float cylinder is orientated so that its mechanical advantage in applying a float force to the header varies with the position of the main frame relative to the attachment frame. Similarly, the pressure exerted by the cylinder varies inversely with its mechanical advantage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Combine headers (or drapers) have a main frame that supports the header or draper structure. The main frame is movable relative to an attachment frame that attaches, through an attachment mechanism, to the feeder house of the combine. The main frame is movable relative to the attachment frame in order to float above the ground (and sometimes in order to set a tilt angle of the header as well). Float mechanisms are sometimes positioned to provide a lifting force to the main frame relative to the attachment frame. This allows the header to respond to changing ground levels to better follow the ground. However, in the past, the force applied by the float mechanism varied as the position of the main frame changed relative to the attachment frame. The present description proceeds with respect to a float assembly that is configured so that the mechanical advantage of the float assembly increases, as the pressure applied by the float mechanism decreases, and vice versa. This inverse relationship between the mechanical advantage of the float mechanism and the pressure applied by the float mechanism reduces the variation in float force applied by the float assembly, due to variation in the position of the main frame relative to the attachment frame.

Figure 1:
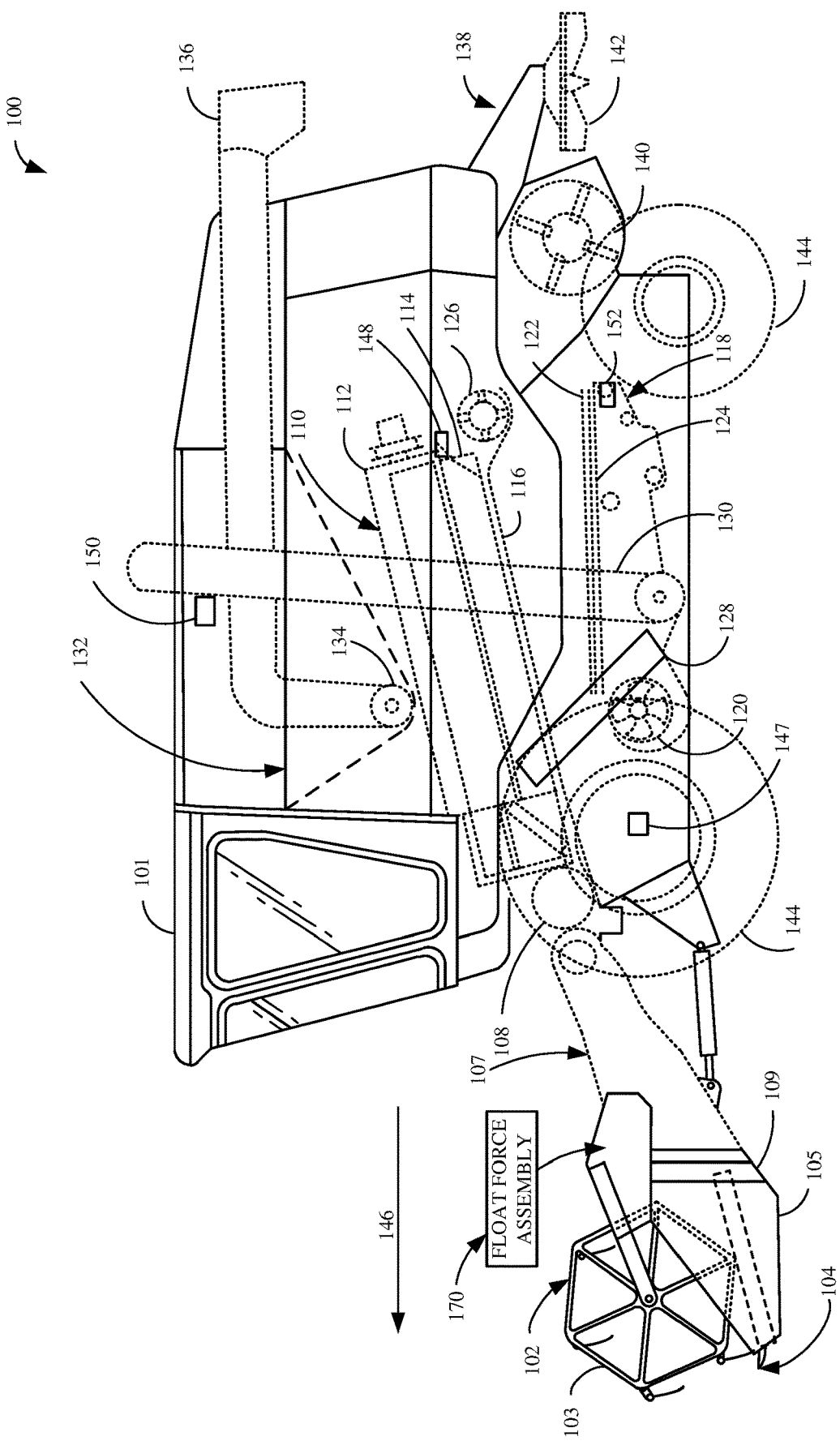
FIG. 1 is a partial pictorial, partial schematic view of a harvester.

FIG. 1 is a partial pictorial, partial schematic, illustration of an agricultural machine 100, in an example where machine 100 is a combine harvester (also referred to as combine 100 or machine 100). It can be seen in FIG. 1 that combine 100 illustratively includes an operator compartment 101, which can have a variety of different operator interface mechanisms, for controlling combine 100. Combine 100 can include a set of front end equipment that can include header 102, and a cutter generally indicated at 104. It can also include a feeder house 107, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 107 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine (or other power source) that drives ground engaging wheels 144 or tracks, etc. It will be noted that combine 100 may also have more than one of any of the subsystems mentioned above (such as left and right cleaning shoes, separators, etc.).

Header 102 has a main frame 105 and an attachment frame 109. Header 102 is attached to feeder house 107 by an attachment mechanism on attachment frame 109 that cooperates with an attachment mechanism on feeder house 107. Main frame 105 supports cutter 104 and reel 103 and is movable relative to attachment frame 109. In one example, main frame 105 and attachment frame 109 can be raised and lowered together to set a height of cutter 104 above the ground over which combine 100 is traveling. In another example, main frame 105 can be tilted relative to attachment frame 109 to adjust a tilt angle with which cutter 104 engages the crop. Also, in one example, main frame 105 can be movable relative to attachment frame 109 in order to improve ground following performance. The movement of main frame 105 together with attachment frame 109 can be driven by actuators (such as hydraulic actuators) based on operator inputs or automated inputs.

In operation, and by way of overview, the height of header 102 is set and combine 100 illustratively moves through a field in the direction indicated by arrow 146. As it moves, header 102 engages the crop to be harvested and gathers it toward cutter 104. After it is cut, the crop can be engaged by reel 103 that moves the crop to feeding tracks 154, 156 (shown in FIG. 2). Feeding tracks move the crop to the center of the header 102 and then through a center feeding track in feeder house 107 toward feed accelerator 108, which accelerates the crop into thresher 110. The crop is threshed by rotor 112 rotating the crop against concaves 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

In one example, combine 100 has a tailings system where tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 147 illustratively senses the travel speed of combine 100 over the ground. This can be done by sensing the speed of rotation of the wheels, the drive shaft, the axle, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

As combine 100 moves in the direction indicated by arrow 146, it may be that the ground under header 102 is uneven. Header 102 is thus provided with ground engaging elements (such as shoes) that engage the surface of the ground over which combine 100 is traveling. Combine 100 is also provided with float force assembly 170. Float force assembly 170 is shown schematically in FIG. 1, and applies a float force, that is illustratively a lifting force that acts against gravity, biasing main frame 105 of header 102 in an upward direction relative to attachment frame 109. Therefore, as the ground under header 102 rises, the ground engaging elements on header 102 engage the rising ground surface and push upwardly on main frame 105. The float force applied by float force assembly 170 assists in raising header 102 up to follow the rising ground surface. In areas where the ground falls off, the weight of header 102 overcomes the float force so that it descends to a point where the ground engaging elements again engage the surface of the ground.

In this way, header 102 follows the surface of the ground, without reacting too quickly, or overreacting to changes in the level of the ground surface. It can also be seen that, if the float force is too low, then even though the ground engaging elements are engaging a raised portion of the ground, header 102 will not react quickly enough and cutter 104 may engage the soil, which can result in reduced harvesting performance and even damage to cutter 104. On the other hand, if the float force is too high, then header 102 will descend too slowly when the ground underneath header 102 drops away. This will reduce the ground following performance of header 102, and thus deleteriously affect the harvesting performance as well.

In some prior systems, the float force applied by the float force assembly used in those prior systems varied based upon the height of header 102 (that is, based upon the position of main frame 105 relative to attachment frame 109). Thus, the ground following performance of header 102 changed with the position of main frame 105 relative to attachment frame 109. This made it difficult to achieve desired ground following performance, and thus compromised harvesting performance.

Figure 2:
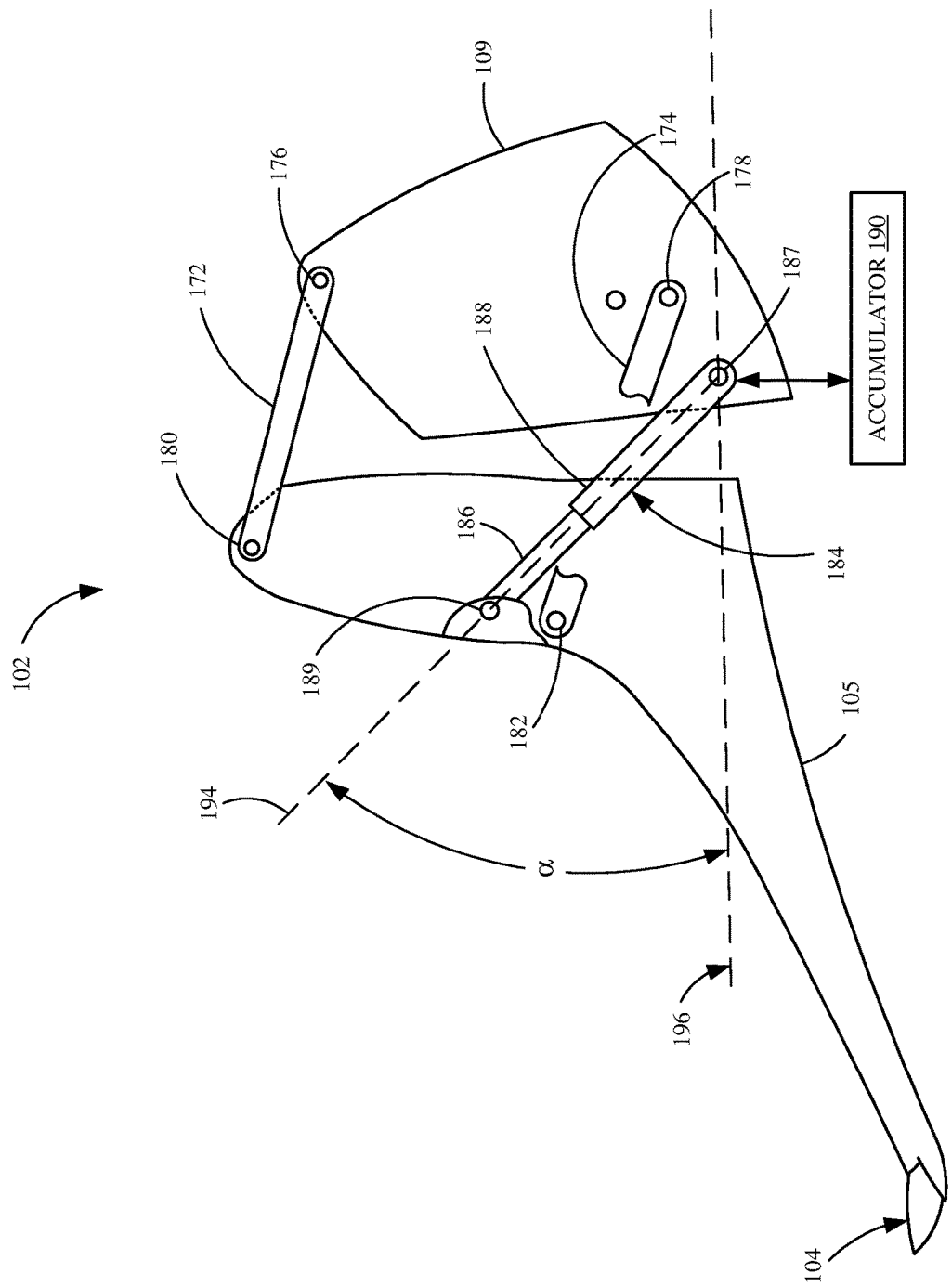
FIG. 2 shows a float force assembly with an attachment frame and main frame in a first position relative to one another.
Figure 3:
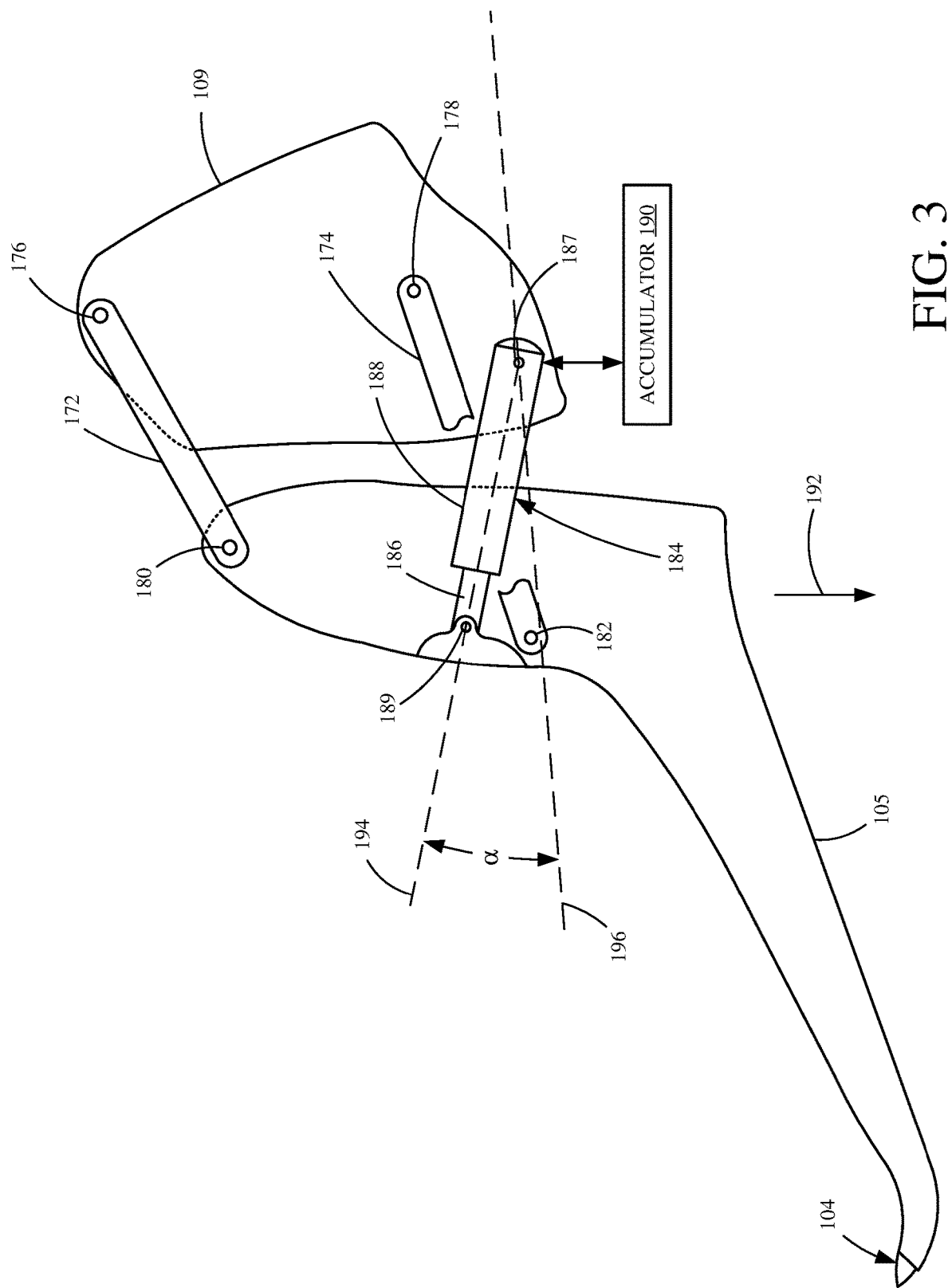
FIG. 3 shows the float force assembly with the attachment frame and main frame in a second position relative to one another.

FIGS. 2 and 3 below show one example of a portion of header 102 with a float force assembly 170, that applies a relatively consistent float force, regardless of the position of main frame 105 relative to attachment frame 109. In the example shown in FIG. 2, some elements are similar to those shown in FIG. 1, and they are similarly numbered.

FIG. 2 shows that main frame 105, which supports cutter 104 and reel 103 (not shown in FIG. 2) is at a first position relative to attachment frame 109. Attachment frame 109 illustratively includes an attachment mechanism (not shown) that attaches to a corresponding attachment mechanism on feeder house 107. The vertical movement of main frame 105 relative to attachment frame 109 is illustratively driven by ground engaging elements, such as shoes or skis (not shown) which act to raise and lower main frame 105 relative to attachment frame 109 as the ground over which the ground engaging elements move rises and falls, respectively. In another example, mainframe 105 can also be tilted relative to attachment frame 109 by a tilt actuator (also not shown).

In the example illustrated in FIG. 2, float force assembly 170 illustratively includes a set of control arms 172 and 174 that are pivotally connected to attachment frame 109 at pivot points 176 and 178, and that are pivotally attached to main frame 105 at pivot points 180 and 182, respectively. Control arms 172 and 174 control the path of movement of main frame 105 relative to attachment frame 109 when the position of main frame 105 relative to attachment frame 109 changes to follow the ground.

Assembly 170 also illustratively includes cylinder 184 that is pivotally connected to attachment frame 109 at pivot point 187, and that is pivotally attached to main frame 105 at pivot point 189. Hydraulic cylinder 184 has a rod portion 186 reciprocally mounted within cylinder portion 188. Assembly 170 also illustratively includes an accumulator 190. Accumulator 190 is shown schematically in FIG. 2. It will be appreciated that, in one example, it can be internal to hydraulic cylinder 184. In another example, it can be separate from hydraulic cylinder 184 and fluidically coupled to hydraulic cylinder 184. In one example, there are at least two float force assemblies 170, disposed in spaced relation to one another across the header 102. This is just an example.

Accumulator 190 can take a wide variety of different forms. For instance, the accumulator 190 can include a diaphragm or other pressure transmitting mechanism. The diaphragm has one side in fluid communication with the base end of cylinder 184 and has a compressible fluid or a compressible gas disposed on its other side. When rod 186 is retracted further into cylinder portion 188, the pressure increases in the base end of cylinder 184, and the diaphragm compresses the compressible medium in accumulator 190, thus increasing the pressure in accumulator 190. When rod end 186 is further extended out of cylinder portion 188, then the pressure in the base end of cylinder 184 is reduced, and the compressible medium expands, pushing against the diaphragm (or other movable member) so that the pressure in accumulator 190 is reduced.

Thus, it can be seen that, as rod end 186 moves into cylinder portion 188, the float force exerted on main frame 105 by cylinder 184 increases. However, as the rod end 186 extends further outward from cylinder portion 188, the pressure exerted by cylinder 184 decreases.

FIG. 2 also shows that cylinder 184 has a longitudinal axis 194 and that main frame 105 is raised to a relatively high position relative to attachment frame 109. Therefore, the angle that the longitudinal axis 194 of cylinder 184 makes relative to a horizontal axis 196 is indicated by the angle alpha. The higher main frame 105 is positioned relative to attachment frame 109 the greater the angle alpha. Thus, it can be seen that the higher main frame 105 is positioned relative to attachment frame 109, the greater the vertically directed force component of the overall force exerted by cylinder 184 on main frame 105. The mechanical advantage of cylinder 184 (e.g., the portion of the overall force exerted by cylinder 184 that is attributable to a vertical, upwardly directed or lifting force component) on main frame 105 increases as the angle alpha increases. Hence, the mechanical advantage of cylinder 184 increases as the height of main frame 105 increases relative to attachment frame 109.

FIG. 3 is similar to FIG. 2, and similar items are similarly numbered. However, it can be seen that main frame 105 has now been moved downwardly, in the direction generally indicated by arrow 192, relative to attachment frame 109. This occurs, for instance, when the ground under header 102 falls away and the main frame 105 of header 102 drops relative to attachment frame 109 to follow the ground. Thus, it can be seen that rod 186 is further retracted into cylinder portion 188. As discussed above, this increases the pressure in accumulator 190 and thus increases the overall pressure or force exerted by cylinder 184 on main frame 105. However, it can also be seen in FIG. 3 that the angle alpha between the horizontal axis 196 and the longitudinal axis 194 of cylinder 184 has also decreased. Thus, the mechanical advantage (the portion of the overall force exerted by cylinder 184 on main frame 105 that forms the vertically directed upward vector) decreases.

FIGS. 2 and 3 make clear that the mechanical advantages of cylinder 184 and the overall force applied by cylinder 184 are inversely related. As main frame 105 is raised relative to attachment frame 109, the mechanical advantage of cylinder 184 increases but the overall force applied by cylinder 184 on main frame 105 decreases. Similarly, as the main frame 105 is lowered relative to attachment frame 109, the mechanical advantage of cylinder 184 decreases, but the overall force applied by cylinder 184 increases. This results in a relatively consistent float force (the vertically upwardly directed force component of the overall force) that is applied on main frame 105, regardless of the vertical position of main frame 105 relative to attachment frame 109. As examples, assembly 170 may be sized so that the float force changes no more than 20%, 10%, or 5% over the permitted travel of main frame 105 relative to attachment frame 109.

It will be appreciated that the float force assembly 170 (which includes cylinder 184 and accumulator 190 and one or more control arms 172-174) can have different dimensions and different charge pressure. It is illustratively a closed system so that no additional sensors or control inputs are needed to modify the float force. Instead, the physical arrangement and orientation of the float force assembly 170 is such that the float force is relatively consistent throughout the extent of travel of main frame 105 relative to attachment frame 109. The precise dimensions of cylinder 184, accumulator 190 and control arms 172 and 174 will vary with the amount of travel that is permitted. The number of cylinders 184, accumulators 190 and control arms 172-174 can also vary based upon the particular application. The charge pressure in cylinder 184 and accumulator 190 will also vary based upon the desired amount of float force, and based upon the weight of the header 102 with which assembly 170 is to operate. It may vary based on other criteria as well. However, it will be appreciated that, because the system is closed, it is relatively simple, it is efficient, and it operates to smooth out the float force contour that would otherwise be seen as the position of main frame 105 varies with respect to the position of attachment frame 109. This improves ground following performance and harvesting performance.

Example 1 is an agricultural harvesting machine header, comprising:

an attachment frame that attaches to a feeder house on the agricultural harvesting machine;

a cutter;

a main frame that supports the cutter; and a float force assembly attached to the main frame and to the attachment frame and that has a force imparting member that exerts a float force on the main frame, the force imparting member being configured so that a mechanical advantage of the force imparting member in imparting the float force changes inversely with a force magnitude imparted by the force imparting member, as a position of the main frame changes relative to a position of the attachment frame.

Example 2 is the agricultural harvesting machine header of any or all previous examples wherein the force imparting member comprises:

a hydraulic cylinder having a first end and a second end, the first end pivotally coupled to the attachment frame and the second end pivotally coupled to the main frame.

Example 3 is the agricultural harvesting machine header of any or all previous examples wherein the float force assembly comprises:

an accumulator coupled to the hydraulic cylinder so that contraction of the hydraulic cylinder increases pressure in the accumulator and increases the float force imparted by the hydraulic cylinder, and so that extension of the hydraulic cylinder decreases pressure in the accumulator and decreases the float force imparted by the hydraulic cylinder.

Example 4 is the agricultural harvesting machine header of any or all previous examples wherein the hydraulic cylinder and the accumulator are configured to form a closed hydraulic system.

Example 5 is the agricultural harvesting machine header of any or all previous examples wherein the hydraulic cylinder is oriented so that a mechanical advantage in imparting the float force changes inversely relative to the float force as the main frame moves relative to the attachment frame.

Example 6 is the agricultural harvesting machine header of any or all previous examples wherein the hydraulic cylinder extends as the main frame moves in a first direction relative to the attachment frame and contracts as the main frame moves in a second direction relative to the attachment frame.

Example 7 is the agricultural harvesting machine header of any or all previous examples wherein the hydraulic cylinder has a longitudinal axis running between the first and second ends thereof and oriented, so the hydraulic cylinder imparts the float force on the main frame, as a lifting force, at a force imparting angle defined by the longitudinal axis of the hydraulic cylinder and a generally horizontal axis.

Example 8 is the agricultural harvesting machine header of any or all previous examples wherein the hydraulic cylinder is coupled to the main frame and to the attachment frame, so the force imparting angle increases as the main frame is raised relative to the attachment frame and decreases as the main frame is lowered relative to the attachment frame.

Example 9 is the agricultural harvesting machine header of any or all previous examples wherein the hydraulic cylinder is coupled to the main frame and to the attachment frame, so the hydraulic cylinder extends as the main frame is raised relative to the attachment frame and contracts as the main frame is lowered relative to the attachment frame.

Example 10 is the agricultural harvesting machine header of any or all previous examples wherein the accumulator is formed within the hydraulic cylinder.

Example 11 is the agricultural harvesting machine header of any or all previous examples wherein the accumulator is external to the hydraulic cylinder and fluidically coupled to the hydraulic cylinder.

Example 12 is the agricultural harvesting machine header of any or all previous examples wherein the float force assembly comprises:

first and second control linkages, each coupled to the attachment frame and the main frame to guide movement of the main frame relative to the attachment frame.

Example 13 is the agricultural harvesting machine header of any or all previous examples and further comprising:

an additional float force assembly attached to the main frame and to the attachment frame and spaced from the float force assembly across the agricultural harvesting machine header, the additional float force assembly having a force imparting member that exerts a float force on the main frame, the force imparting member being configured so that a mechanical advantage of the force imparting member in imparting the float force changes inversely with a force magnitude imparted by the force imparting member, as a position of the main frame changes relative to a position of the attachment frame.

Example 14 is an agricultural harvesting machine header, comprising:

an attachment frame that attaches to a feeder house on the agricultural harvesting machine;

a cutter;

a main frame that supports the cutter;

a hydraulic cylinder having a first end and a second end, and exerting a float force on the main frame, the first end pivotally coupled to the attachment frame and the second end pivotally coupled to the main frame, the hydraulic cylinder extending as the main frame moves in a first direction relative to the attachment frame and retracting as the main frame moves in a second direction relative to the attachment frame, the hydraulic cylinder having a longitudinal axis, defined by the first and second ends, that is oriented at an angle relative to a horizontal axis, the angle changing as the main frame moves relative to the attachment frame; and an accumulator coupled to the hydraulic cylinder so that contraction of the hydraulic cylinder increases pressure in the accumulator and increases the float force imparted by the hydraulic cylinder, and so that extension of the hydraulic cylinder decreases pressure in the accumulator and decreases the float force imparted by the hydraulic cylinder.

Example 15 is the agricultural harvesting machine header of any or all previous examples wherein the hydraulic cylinder is oriented so that a mechanical advantage in imparting the float force changes inversely relative to a magnitude of the float force as the main frame moves relative to the attachment frame.

Example 16 is the agricultural harvesting machine header of any or all previous examples wherein the hydraulic cylinder and the accumulator are configured to form a closed hydraulic system.

Example 17 is the agricultural harvesting machine header of any or all previous examples wherein the hydraulic cylinder is oriented, so the hydraulic cylinder imparts the float force on the main frame, as a lifting force, at a force imparting angle defined by the angle of the longitudinal axis of the hydraulic cylinder relative to the horizontal axis.

Example 18 is the agricultural harvesting machine header of any or all previous examples wherein the hydraulic cylinder is coupled to the main frame and to the attachment frame, so the force imparting angle increases as the main frame is raised relative to the attachment frame and decreases as the main frame is lowered relative to the attachment frame.

Example 19 is the agricultural harvesting machine header of any or all previous examples wherein the hydraulic cylinder is coupled to the main frame and to the attachment frame, so the hydraulic cylinder extends as the main frame is raised relative to the attachment frame and contracts as the main frame is lowered relative to the attachment frame.

Example 20 is an agricultural harvesting machine header, comprising:
an attachment frame that attaches to a feeder house on the agricultural harvesting machine;
a cutter;
a main frame that supports the cutter;
a hydraulic cylinder having a first end and a second end, and exerting a float force on the main frame, the first end pivotally coupled to the attachment frame and the second end pivotally coupled to the main frame, the hydraulic cylinder extending as the main frame moves in a upward direction relative to the attachment frame and retracting as the main frame moves in a downward direction relative to the attachment frame, the hydraulic cylinder having a longitudinal axis, defined by the first and second ends, that is oriented at an angle relative to a horizontal axis, the angle increasing as the main frame moves upward relative to the attachment frame and decreasing as the main frame moves downward relative to the attachment frame; and
an accumulator coupled to the hydraulic cylinder so that contraction of the hydraulic cylinder increases pressure in the accumulator and increases the float force imparted by the hydraulic cylinder, and so that extension of the hydraulic cylinder decreases pressure in the accumulator and decreases the float force imparted by the hydraulic cylinder.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural harvesting machine header, comprising:
an attachment frame that attaches to a feeder house on the agricultural harvesting machine;
a cutter;
a main frame that supports the cutter; and
a float force assembly comprising:
a hydraulic cylinder having a first end pivotally coupled to the main frame and a second end pivotally coupled to the attachment frame and that exerts a float force on the main frame, the hydraulic cylinder being configured so that a mechanical advantage of the hydraulic cylinder in imparting the float force changes inversely with a force magnitude imparted by the hydraulic cylinder, as a position of the main frame changes relative to a position of the attachment frame.

2. The agricultural harvesting machine header of claim 1, wherein the float force assembly comprises:
an accumulator coupled to the hydraulic cylinder so that contraction of the hydraulic cylinder increases pressure in the accumulator and increases the float force imparted by the hydraulic cylinder, and so that extension of the hydraulic cylinder decreases pressure in the accumulator and decreases the float force imparted by the hydraulic cylinder.

3. The agricultural harvesting machine header of claim 2 wherein the hydraulic cylinder and the accumulator are configured to form a closed hydraulic system.

4. The agricultural harvesting machine header of claim 2 wherein the hydraulic cylinder is oriented so that a mechanical advantage in imparting the float force changes inversely relative to the float force as the main frame moves relative to the attachment frame.

5. The agricultural harvesting machine header of claim 2 wherein the hydraulic cylinder extends as the main frame moves in a first direction relative to the attachment frame and contracts as the main frame moves in a second direction relative to the attachment frame.

6. The agricultural harvesting machine header of claim 5 wherein the hydraulic cylinder has a longitudinal axis running between the first and second ends thereof and oriented, so the hydraulic cylinder imparts the float force on the main frame, as a lifting force, at a force imparting angle defined by the longitudinal axis of the hydraulic cylinder and a generally horizontal axis.

7. The agricultural harvesting machine header of claim 6 wherein the hydraulic cylinder is coupled to the main frame and to the attachment frame, so the force imparting angle increases as the main frame is raised relative to the attachment frame and decreases as the main frame is lowered relative to the attachment frame.

8. The agricultural harvesting machine header of claim 7 wherein the hydraulic cylinder is coupled to the main frame and to the attachment frame, so the hydraulic cylinder extends as the main frame is raised relative to the attachment frame and contracts as the main frame is lowered relative to the attachment frame.

9. The agricultural harvesting machine header of claim 2 wherein the accumulator is formed within the hydraulic cylinder.

10. The agricultural harvesting machine header of claim 2 wherein the accumulator is external to the hydraulic cylinder and fluidically coupled to the hydraulic cylinder.

11. The agricultural harvesting machine header of claim 4 wherein the float force assembly comprises:
first and second control linkages, each coupled to the attachment frame and the main frame to guide movement of the main frame relative to the attachment frame.

12. The agricultural harvesting machine header of claim 1 and further comprising:
an additional float force assembly attached to the main frame and to the attachment frame and spaced from the float force assembly across the agricultural harvesting machine header, the additional float force assembly having a force imparting member that exerts a float force on the main frame, the force imparting member being configured so that a mechanical advantage of the force imparting member in imparting the float force changes inversely with a force magnitude imparted by the force imparting member, as a position of the main frame changes relative to a position of the attachment frame.

13. An agricultural harvesting machine header, comprising:
an attachment frame that attaches to a feeder house on the agricultural harvesting machine;
a cutter;
a main frame that supports the cutter;
a hydraulic cylinder having a first end and a second end, and exerting a float force on the main frame, the first end pivotally coupled to the attachment frame and the second end pivotally coupled to the main frame, the hydraulic cylinder extending as the main frame moves in a first direction relative to the attachment frame and retracting as the main frame moves in a second direction relative to the attachment frame, the hydraulic cylinder having a longitudinal axis, defined by the first and second ends, that is oriented at an angle relative to a horizontal axis, the angle changing as the main frame moves relative to the attachment frame; and an accumulator coupled to the hydraulic cylinder so that contraction of the hydraulic cylinder increases pressure in the accumulator and increases the float force imparted by the hydraulic cylinder, and so that extension of the hydraulic cylinder decreases pressure in the accumulator and decreases the float force imparted by the hydraulic cylinder.

14. The agricultural harvesting machine header of claim 13 wherein the hydraulic cylinder is oriented so that a mechanical advantage in imparting the float force changes inversely relative to a magnitude of the float force as the main frame moves relative to the attachment frame.

15. The agricultural harvesting machine header of claim 14 wherein the hydraulic cylinder and the accumulator are configured to form a closed hydraulic system.

16. The agricultural harvesting machine header of claim 15 wherein the hydraulic cylinder is oriented, so the hydraulic cylinder imparts the float force on the main frame, as a lifting force, at a force imparting angle defined by the angle of the longitudinal axis of the hydraulic cylinder relative to the horizontal axis.

17. The agricultural harvesting machine header of claim 16 wherein the hydraulic cylinder is coupled to the main frame and to the attachment frame, so the force imparting angle increases as the main frame is raised relative to the attachment frame and decreases as the main frame is lowered relative to the attachment frame.

18. The agricultural harvesting machine header of claim 17 wherein the hydraulic cylinder is coupled to the main frame and to the attachment frame, so the hydraulic cylinder extends as the main frame is raised relative to the attachment frame and contracts as the main frame is lowered relative to the attachment frame.

19. An agricultural harvesting machine header, comprising:
an attachment frame that attaches to a feeder house on the agricultural harvesting machine;
a cutter;
a main frame that supports the cutter;
a hydraulic cylinder having a first end and a second end, and exerting a float force on the main frame, the first end pivotally coupled to the attachment frame and the second end pivotally coupled to the main frame, the hydraulic cylinder extending as the main frame moves in a upward direction relative to the attachment frame and retracting as the main frame moves in a downward direction relative to the attachment frame, the hydraulic cylinder having a longitudinal axis, defined by the first and second ends, that is oriented at an angle relative to a horizontal axis, the angle increasing as the main frame moves upward relative to the attachment frame and decreasing as the main frame moves downward relative to the attachment frame; and
an accumulator coupled to the hydraulic cylinder so that contraction of the hydraulic cylinder increases pressure in the accumulator and increases the float force imparted by the hydraulic cylinder, and so that extension of the hydraulic cylinder decreases pressure in the accumulator and decreases the float force imparted by the hydraulic cylinder.

\* \* \* \* \*